United States Patent [19]

Harrison

[11] Patent Number: 5,924,240
[45] Date of Patent: Jul. 20, 1999

[54] DEVICE TO WATER AND FERTILIZE PLANTS

[76] Inventor: Mark R. Harrison, 4120 Fowler Ridge Dr., Raleigh, N.C. 27616

[21] Appl. No.: 08/911,433

[22] Filed: Aug. 12, 1997

Related U.S. Application Data

[60] Provisional application No. 60/023,598, Aug. 14, 1996.

[51] Int. Cl.⁶ .................................................. A01G 29/00
[52] U.S. Cl. ............................................................ 47/48.5
[58] Field of Search ................................................ 47/48.5

[56] References Cited

U.S. PATENT DOCUMENTS

| | | |
|---|---|---|
| 73,442 | 1/1868 | Fish . |
| 349,874 | 9/1886 | Bührer . |
| 419,242 | 1/1890 | Brown . |
| 1,280,486 | 10/1918 | Kanst ........................ 47/48.5 |
| 1,424,157 | 8/1922 | Cook ......................... 47/48.5 |
| 1,455,593 | 5/1923 | Lewin et al. . |
| 1,490,865 | 4/1924 | Van de Velde ............ 47/48.5 |
| 1,586,676 | 6/1926 | Heath ........................ 47/48.5 |
| 2,685,761 | 8/1954 | Schlesser .................. 47/48.5 |
| 2,791,347 | 5/1957 | Boehm . |
| 2,809,468 | 10/1957 | Eliot ......................... 47/48.5 |
| 3,345,774 | 10/1967 | Delbuguet ................. 47/48.5 |
| 3,460,562 | 8/1969 | Moulder .................... 47/48.5 |
| 3,461,606 | 8/1969 | Caloia ....................... 47/48.5 |
| 3,916,564 | 11/1975 | Crowell, Sr. .............. 47/48.5 |
| 4,361,983 | 12/1982 | Wilson . |
| 4,499,686 | 2/1985 | Scragg . |
| 4,578,897 | 4/1986 | Pazar et al. . |
| 4,866,880 | 9/1989 | Weinblatt . |
| 4,970,823 | 11/1990 | Chen et al. . |
| 5,009,028 | 4/1991 | Lorenzana et al. . |
| 5,172,515 | 12/1992 | Lapshansky, Sr. et al. .......... 47/48.5 |
| 5,259,142 | 11/1993 | Sax . |

FOREIGN PATENT DOCUMENTS

| | | | |
|---|---|---|---|
| 2673356 | 9/1992 | France ....................... 47/48.5 |
| 3510727 | 1/1986 | Germany ................... 47/48.5 |
| 0141227 | 9/1982 | Japan ........................ 47/48.5 |
| 391368 | 8/1965 | Switzerland ............... 47/48.5 |
| 2249463 | 5/1992 | United Kingdom ....... 47/48.5 |

*Primary Examiner*—Michael J. Carone
*Assistant Examiner*—Joanne C. Downs
*Attorney, Agent, or Firm*—Richard C. Litman

[57] ABSTRACT

A device for watering and feeding living plants including a cylindrical tube, closed at the bottom and the top having a funnel-shaped orifice to receive and hold an inverted reservoir (for example, a two or three liter plastic bottle). The tube is buried vertically in earth or plant soil to expose only the orifice, which may be capped when not in use allowing camouflage of the device at the soil surface. Two holes in the sidewall of the tube allow water and water soluble plant nutrients to pass therethrough slowly.

10 Claims, 1 Drawing Sheet

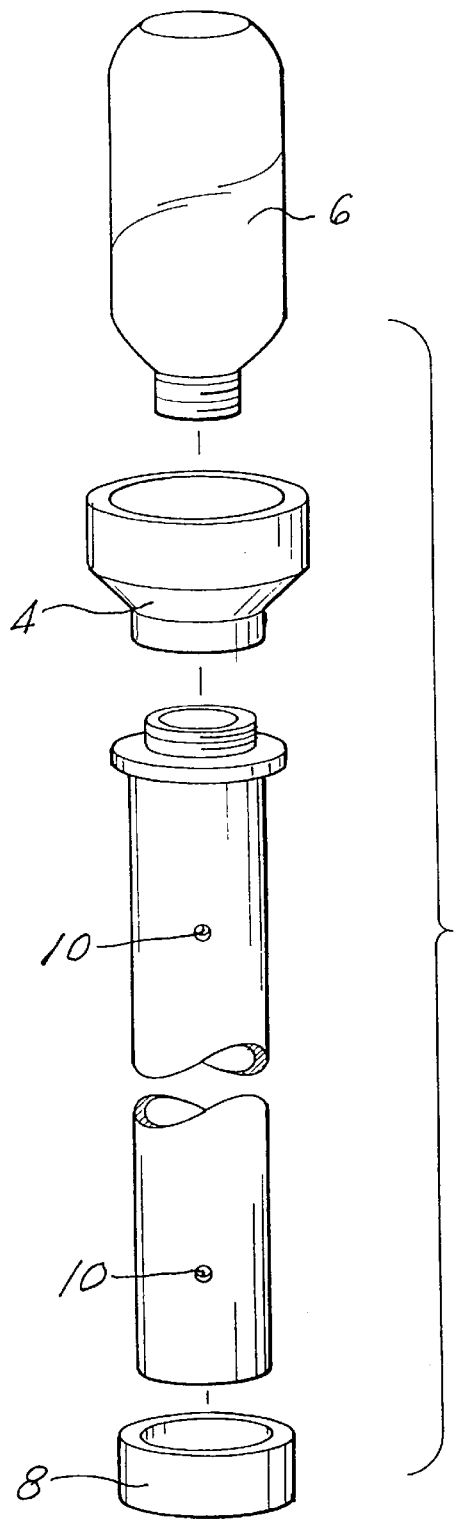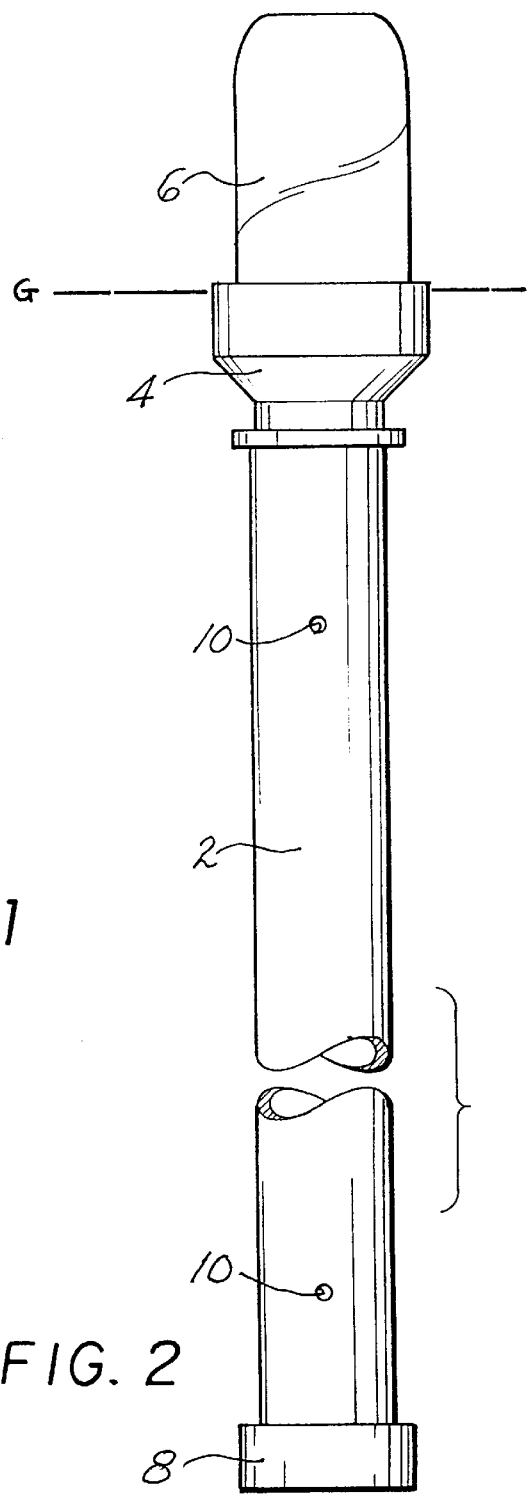

DEVICE TO WATER AND FERTILIZE PLANTS

CROSS-REFERENCE TO RELATED APPLICATION

This application claims the benefit of U.S. Provisional Patent Application Ser. No. 60/023,598, filed Aug. 14, 1996.

BACKGROUND OF THE INVENTION

1. Field of the Invention

The present invention relates to a device, kit, apparatus and method for controllably supplying water and plant nutrients to the root vicinity of living plants surrounded by earth or plant soil.

2. Description of the Prior Art

This invention relates to devices for watering and feeding living plants. It is common to periodically provide water and fertilizer to plants via some form of irrigation. Several attempts have been made in the past to irrigate plants properly. For example, U.S. Pat. No. 4,578,897, issued Apr. 1, 1986 to Pazar et al., discloses a dispensing device comprising an air tube extending throughout the central length of a plastic bottle and past the mouth of the bottle. U.S. Pat. No. 4,970,823, issued Nov. 20, 1990 to Chen et al., shows a container for supplying water and nutrients directly into soil adjacent to a plant. A cap structure both supports the bottle upright and allows transfer of liquid downwardly from the bottle into the soil. U.S. Pat. No. 5,259,142, issued Nov. 9, 1993 to Sax, shows a plant irrigation device for a potted plant including a hollow stake adapted to be inserted into the soil adjacent to a plant. An air vent is located near the upper end of the inverted bottle. Further, U.S. Pat. No. 5,009,028, issued Apr. 23, 1991 to Lorenzana et al., shows an apparatus for supplying water continuously to a Christmas tree stand comprising a bottle-type reservoir and base for supporting same in an inverted position. Water continues to flow only as air is permitted to enter the mouth of the bottle. Col. 3, line 27. Other U.S. Patents showing related devices are U.S. Pat. Nos. 349,874, issued Sep. 28, 1886 to Bührer; 4,361,983, issued Dec. 7, 1982 to Wilson; 4,499,686, issued Feb. 19, 1985 to Scragg; 419,242 issued Jan. 14, 1890 to Brown; 4,866,880, issued Sep. 19, 1989 to Weinblatt; 2,791,347, issued May 7, 1957 to Boehm; 73,442, issued Jan. 21, 1868 to Fish; and 1,455,593, issued May 15, 1923 to Lewin et al.

None of the above inventions and patents, taken either singly or in combination, is believed to describe the instant invention as claimed.

SUMMARY OF THE INVENTION

Proper irrigation and fertilization has been a major concern. It is the basis to which the presently claimed invention is drawn. The present invention provides a simple yet comprehensive device and method for introducing water and fertilizer to the subterranean root system of plants. The invention is an underground water and fertilizer distributor. The distributor is used with a reservoir of any conventional bottle type. The distributor holds the reservoir in an inverted disposition, and automatically releases water or fertilizer or a combination of such to the subterranean roots. The distributor comprises an elongated tube having a seal at a first end, at least a pair of holes vertically disposed in a sidewall of the tube, a reservoir receiver disposed at a second end, and a removable closure coupled to the reservoir receiver. The tube is to be positioned vertically into the earth or plant soil adjacent to a living plant. The holes in the sidewall of the tube allow water to pass from the reservoir and the internal part of the tube into the surrounding soil and root system of a plant. When not in use, the removable closure prevents the inside of the tube from being filled with undesired debris, dirt or organic matter.

Accordingly, it is a principal object of the invention to provide an apparatus and method for watering and feeding plants.

It is another object of the invention to provide a device and method utilizing non-toxic materials for dispensing water and plant nutrients.

It is a further object of the invention to water and feed plants in a metered, steady and controlled manner utilizing materials that are non-toxic to both the terrain and the plant.

Still another object of the invention is to provide a plant water and fertilizer distributor having a closure for preventing impurities from entering the distribution tube.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 1 is an exploded, partially fragmented, perspective view of the apparatus.

FIG. 2 is an elevational view of the apparatus, partially fragmented as it would appear in use in the earth near the roots of a plant.

Similar reference characters denote corresponding features consistently throughout the attached drawings.

DETAILED DESCRIPTION OF THE PREFERRED EMBODIMENTS

Referring to FIGS. 1 and 2, the present invention is a device for metering, and distributing, automatically, water and fertilizer, plant food, and nutrients (of the water soluble type) to subterranean root system of plants. The device consists of a cylindrical 2 tube having a predetermined diameter and length, and made of a material which is resistant to corrosion or decomposition and is non-toxic to the ground and plants. Materials of the plastic origin are most suitable, for example, a molded or formed mixture of polyvinyl chloride polymer and inert filler. Polyvinyl chloride pipe, known also as PVC pipe, is widely used as water transporting piping or plumbing. It is also within the scope of the invention that tubes made from other non-toxic, corrosion resistant metallic or polymer compositions may be used. Compositions such as polypropylene resins or polymers, aluminum and aluminum alloys are some representatives of a multiplicity of appropriate materials.

The tube is made of an appropriate diameter and length, the selection of the dimensions being substantially a function of rate of water and nutrient flow considered to be optimal for the size, age and characteristic requirements of the particular plant being watered and fed, and the type and condition of the soil in which the rooted plant is placed. For relatively large plants, greater length and diameter on the average may be suitable, whereas for small plants, as potted house plants, a much smaller length and diameter would be appropriate.

As can be observed in FIG. 2, a first portion of the metering device is embedded in a plant bed below ground level G and a second portion, including a reservoir 6, is positioned above ground level G when in use. The reservoir 6, for example, may be a common two or three liter plastic beverage bottle, filled with water and preferably water soluble plant nutrients and the like, which is then inserted into a funnel-like element, reservoir receiver 4. Reservoir receiver 4 securely retains the reservoir 6, the receiver having a funnel-shaped passage to receive and hold an inverted reservoir 6. Reservoir receiver 4 is securely fastened to tube 2. In the case where PVC pipe is used, conical reservoir receiver 4 may be cemented to the pipe using conventional PVC cements. Preferably, tube 2 has an externally threaded end with a flanged stop that matingly engages an internal thread of reservoir receiver 4.

Water, etc., is introduced into the tube 2 from the reservoir 6. Under gravitational forces, the water fills the tube 2 and flows slowly into the surrounding soil through two holes 10 if the soil is not saturated with water. The holes 10 extend completely through the wall of the tube 2. The holes 10 are designed to have a size appropriate to allow only a trickle of water flow therethrough. Moreover, it is preferable to position the holes 10 on only one side of the tube 2.

Through experiment, the suitable diameter for the holes 10 through the tube 2 is on the order of 5/64 inches for a tube 2 having an outside diameter on the order of 1½ inches and a length on the order of 12 inches. Further, it has been determined that for a watering device of length and diameter mentioned above, no more than two holes should be present in the sidewall of the tube 2.

The tube 2 is closed at the end opposite that of the water and nutrient source or input, i.e. the bottom end or the end which is to be embedded farthest into the soil. FIGS. 1 and 2 show the bottom end to be closed with a cap 8. Cap 8 may be secured by friction fitting, adhesive, or bonding. However, this closure may be also accomplished by any suitable and secure means. For example, the bottom end may be closed with a plug inserted into the tube. Alternatively, tube 2 may be closed using a disk-shaped stopper cemented to the internal portion of the tube. It is important that the tube 2 be tightly closed at the bottom end to limit the flow of water and nutrients out of the bottom. If water were to flow too rapidly out of the bottom end, a slow trickle of water flow would not be achieved, which is what is desired in the feeding and fertilization of most plants.

Further, having the bottom end closed makes the device respond to soil saturation, since if the soil surrounding the tube 2 is saturated with water, there will be very little water flow from the reservoir 6 into the soil. In this respect, when the watering device is used in a soil that is saturated with water, and the reservoir 6 is filled with water, water flow from the reservoir 6 will flow into the tube 2 and remain there until the soil is reduced in water content sufficiently to allow water to again flow out of the tube 2 and reservoir 6. Stated alternatively, when the pipe becomes filled with water and does not flow out through the holes, flow from the reservoir 6 is stopped. Then, as water flows slowly through the holes, an equal amount drains from the bottle or reservoir 6.

Reservoir receiver 4 is a conic-like, funnel-shaped member. Its configuration and size conveniently allows the use of a common two or three liter bottle, or the like, as a reservoir 6 or water container. Moreover, its flat top end allows the receiver 4 to be buried essentially to ground level G so that, when not receiving a reservoir 6, the flat end can be covered to prevent entry of undesired debris and camouflaged with bedding materials to be hidden from view.

Thus, the cylindrical pipe or tube 2 in use is to be completely buried in the soil near the plant to be watered and/or fertilized. However, the top most portion 4 remains slightly above the level of the soil. When the plant watering-fertilizing device is not in use, a reusable top or cap (not shown in the drawings) is fitted into the inside diameter portion thereof or over the top thereof to disallow the tube 2 to fill with debris and dirt. A top may be designed to screw into threaded elements on the inside of reservoir receiver 4. Alternatively, the top may be designed to fit snugly over the outside diameter of reservoir receiver 4.

While the plant watering device has been shown and described as being made of several different elements combined, it is also contemplated that the tube 2, funnel reservoir receiver 4 and end portion 8 may be made of a single piece of molded solid polymer composition. The expressions "solid polymer composition" and "plastic" are intended to mean a thermoplastic, thermoset or elastomeric organic polymer or resin composition, for example, polyalkylenes such as polyethylene or polypropylene, polyvinyl polymers and copolymers thereof or polyacrylates or polystyrene.

It is to be understood that the present invention is not limited to the embodiments described above, but encompasses any and all embodiments within the scope of the following claims.

I claim:

1. A device for delivering water and water soluble plant nutrients to the immediate proximity of subterranean roots of living plants comprising:

a tubular member having a continuous wall, a first end portion, a second end portion, and at least one but no more than two openings through said wall at a predetermined distance from said first end portion, said second end portion having a flange stop and an externally threaded portion;

a sealing cap for sealing said first end portion of said tubular member;

a funnel-shaped reservoir receiver having a lower internally threaded orifice, said lower internally threaded orifice matingly engaging said externally threaded portion, and an upper orifice, said lower orifice having a inner diameter less than that of said upper orifice; and a bottle having a mouth removably disposed in said reservoir receiver when said bottle is inverted, said reservoir receiver having a shape adapted to receive said bottle, so that said bottle when filled with a volume of water and water soluble nutrients, automatically distributes same to the tubular member by gravity feeding.

2. The device according to claim 1, said reservoir receiver further including a removable closure means for preventing objects from entering said upper orifice when said bottle is removed.

3. The device according to claim 1, each of said tubular member, said reservoir receiver, said bottle, and said sealing cap being formed from a non-toxic material.

4. The device according to claim 3, wherein said non-toxic material is a plastic.

5. The device according to claim 1, wherein said tubular member has a first opening disposed in said first end portion and a second opening disposed in said second end portion.

6. The device according to claim 1, wherein said at least one opening is dimensioned and calibrated to meter water and water soluble nutrients to the subterranean roots in an automatic and efficient manner.

7. A device for delivering water and water soluble plant nutrients to the immediate proximity of subterranean roots of living plants, said device comprising:

- a tubular member having a continuous wall, a first end portion, a second end portion, and two openings through said wall;
- a sealing cap for sealing said first end portion of said tubular member; and
- a funnel-shaped reservoir receiver attached to said second end portion, said reservoir receiver having a lower orifice and an upper orifice, said lower orifice having a inner diameter less than that of said upper orifice; and
- a bottle having a mouth removably disposed in said reservoir receiver when said bottle is inverted, said reservoir receiver having a shape adapted to receive said bottle.

8. The device according to claim 7, wherein the tubular member, the reservoir receiver, and the sealing cap are composed of a single piece of molded polymer composition.

9. The device according to claim 7 wherein the tubular member, the reservoir receiver, and the sealing cap are composed of a polyvinyl chloride composition, and the reservoir receiver is cemented to the tubular member.

10. The device according to claim 7, wherein the bottle is selected from the group consisting of two liter and three liter bottles.

* * * * *